US005537160A

United States Patent [19]
King

[11] Patent Number: 5,537,160
[45] Date of Patent: Jul. 16, 1996

[54] REAR VIEW EYEWEAR MIRROR ADJUSTED BY ROTATION

[76] Inventor: Kevin R. King, 5111 59th Ave. Ct. W., Tacoma, Wash. 98467

[21] Appl. No.: 201,230

[22] Filed: Feb. 24, 1994

[51] Int. Cl.⁶ .................................................. G02C 7/14
[52] U.S. Cl. ........................................ 351/50; 351/158
[58] Field of Search ............................ 351/50, 52, 158; 359/876, 879, 880

[56] References Cited

U.S. PATENT DOCUMENTS

| | | | |
|---|---|---|---|
| 1,074,145 | 9/1913 | Walts | 351/50 |
| 1,359,576 | 11/1920 | Colman | 351/50 |
| 1,892,365 | 12/1932 | Rowan | 351/50 |
| 1,916,110 | 6/1933 | Julien | 351/50 |
| 2,176,167 | 10/1939 | Comstock | 351/50 |
| 2,331,640 | 10/1943 | Valentine | 351/50 |
| 2,739,508 | 3/1956 | Reed | 351/50 |
| 2,917,970 | 12/1959 | La Bard | 351/50 |
| 3,423,150 | 1/1969 | Freed | 351/50 |
| 4,298,254 | 11/1981 | Reddick | 351/50 |
| 5,044,741 | 9/1991 | De Giacomi | 351/50 |
| 5,416,536 | 5/1995 | Tee, Jr. | 351/50 |

FOREIGN PATENT DOCUMENTS

| | | | |
|---|---|---|---|
| 3701 | of 1885 | United Kingdom | 351/50 |
| 3823366 | 1/1990 | United Kingdom | 351/50 |
| 4019911 | 1/1992 | United Kingdom | 351/50 |

Primary Examiner—William L. Sikes
Assistant Examiner—James A. Dudok

[57] ABSTRACT

A circular rear view eyewear mirror, approximately 9 min. in diameter, consisting of a reflective surface permanently attached with epoxy adhesive to a cylindrical plastic base with one end obliquely cross-sectioned to form an ellipse. The angle formed by this oblique cross-sectioning of the base allows the rear view eyewear mirror to fit differing types of eyewear, including modern wrap-around sports eyewear. The elliptical end is attached semi-permanently to the rearward surface of the eyewear lens with double-backed adhesive tape. These elements, when assembled, are considered one piece in use and have no moving parts in relation to each other. The rear view eyewear mirror may be angularly adjusted by clockwise or counter-clockwise rotation before semi-permanent attachment by rotation upon the rearward surface of the eyewear lens. This adjustment of the rear view eyewear mirror allows for angular adjustment of the image seen by the wearer. Normal forward vision through the eyewear lens is not impeded by the rear view eyewear mirror. The attachment of the rear view eyewear mirror is semi-permanent because the mirror may be easily removed and re-positioned without scratching or marring the rearward surface of the eyewear lens. The adjustment of the rear view eyewear mirror, once semi-permanently attached to the eyewear lens, remains unaffected by normal use of the eyewear and holds its initial adjustment even when bumped or jarred. The rear view eyewear mirror may be attached to either the right or left eyewear lens for use by the right or left eye, or both.

5 Claims, 3 Drawing Sheets

REAR VIEW EYEWEAR MIRROR ADJUSTED BY ROTATION

BACKGROUND OF THE INVENTION

This invention relates to rear view eyewear mirrors, specifically to such rear view mirrors which are adjusted by rotation and by area of placement upon the rearward surface of eyewear lenses.

DESCRIPTION OF PRIOR ART

As far back as the late 19th century, rear view eyewear mirrors were designed to enable wearers to see behind them, as a useful curiosity. Their anticipated wearers included organists, bicyclists, detectives, huntsmen and others who would benefit from being able to see behind them. Their purpose was similar to rear view mirrors designed in the 20th century for automobiles, which enabled drivers to see the road behind them.

Although there have been some prior designs, they proved to have many disadvantages. For example, all the mirrors incorporating a clamp or clip for attachment to the eyewear presented the risk of scratching the lens and/or frame. "Adjustable" mirrors proved to be complicated to adjust to the individual wearer's field of vision, appeared dangerous or were permanently attached. Many of the mirrors were expensive or required professional installation. Many of the designs did not accommodate different wearers, or their design was unsafe in close proximity to the wearer's eye in the event of mishap. None was designed to fit different brands and types of eyewear having lenses of differing radii of curvature, such as modern wrap-around sports eyewear. Each had the following specific disadvantages:

For example, in U.K. patent 3701 to Galland-Mason (1885), a reflector of any suitable form and material, such as a flat piece of silvered glass, was attached to an ordinary pair of spectacles onto the inner face of each lens at the outside edge with an adhesive cement. Hence, it had no means of adjustment and was permanently cemented onto the lens.

U.S. Pat. No. 1,074,145 to Waits (1913) presented dual mirrors mounted to the eyewear frame by a series of pivoted levers, or arms, which positioned the mirrors to the inside of eyewear lenses. While claiming concealability and adjustability, the mirrors presented a physically complicated, awkward and bulky design which could interfere with the wearer's vision and presented an obvious danger to the wearer's eye. The mirrors also lacked a permanent means of adjustment.

Another example was U.S. Pat. No. 1,359,576 to Colman (1920), which attempted to accomplish some sort of adjustment by attaching a removable mirror to the lens with a clip attachment. However, the mirrors required custom grinding by an optician to accommodate the particular wearer's vision, and the lenses also had to be custom ground to form a recess to accept the mirror. This was a cumbersome, expensive, and permanent alteration to the lenses of the eyewear.

A mirror which presented the possibility of injury to the wearer's eyes in a mishap was U.S. Pat. No. 1,892,365 to Rowan (1932). The inventor's desire to achieve adjustability and economical production led to a gooseneck design which appeared to be a dangerous obstruction. Furthermore, the gooseneck itself was made of pliable wire, which could easily lose its adjustment and cause unwanted vibration.

U.S. Pat. No. 1,916,110 to Julien (1933) was a permanent alteration to the eyewear lens to receive a mirror permanently attached to the eyewear lens, and a mirror which clipped to the bow of the eyewear frame, positioned behind the lens. Although the clipped mirror was removable, there was no claimed means of permanent adjustment. A further major disadvantage was the need for permanent alteration to the lens.

In U.S. Pat. No. 2,176,167 to Comstock (1939) the inventor sought a simple and efficient detachable mirror which did not interfere with forward vision by attachment to the outer edge of the lens. However, the method of attachment was again by a clamp, and not only was complicated, with a number of parts, but also created an unsightly mirror that required severe movement of the eye to be used.

U.S. Pat. No. 2,331,640 to Valentine (1943) consisted of eyewear with mirror which was an integral part of the frame. The mirror was mounted externally to the frame and therefore it was not easily removable and presented the usual problems of loss of adjustment while in use or storage, and exposure to the elements.

Rather than a mirror, U.S. Pat. No. 2,739,508 to Reed (1956) and U.S. Pat. No. 3,423,150 to Freed (1969) presented glasses incorporating rear vision mirrors integral in the glasses themselves. Reed's design required a rivet through holes in the lenses and was not removable once installed. Also its design projected the mirrors away from the lenses toward the wearer's eyes, and appeared dangerous. Freed's design required some form of support, such as a headband, and was unsightly and cumbersome.

U.S. Pat. No. 2,917,970 to LaBard (1959) attached rear view mirrors to eyeglasses by clips which could scratch both the lenses and the frame of the glasses. As with other mirrors extending outside the frame, disadvantages included unsightliness and the need for severe eye movement. Also, although attempting to offer adjustment by a "swivel" feature, the mirrors could inadvertantly be bumped, thereby changing the adjustment.

U.S. Pat. No. 4,298,254 to Reddick (1981) was attached inside the eyeglass frame and was initially adjustable, but once applied, it was permanent and could not be readjusted or removed. It also had several parts and had a complicated installation and adjustment procedure. Since glue was required, there was a possibility of getting glue on the lenses and/or mirrors during the installation process.

U.K. patent DE 3823-366-A to Pupp (1990) again presented a design for eyeglasses incorporating mirrors on the lenses but was produced as a unit, with no means of adjustability.

U.S. Pat. No. 5,044,741 to De Giacomi (1991) consisted of eyeglasses with integral rearview mirrors mounted permanently in the upper corners of the eyewear frame. Although somewhat adjustable, the mirrors could not be removed. Also, since the invention consisted of the eyeglasses, the mirrors could not accommodate different brands or styles of modern sports eyewear.

U.K. patent DE 4019-911-A to Wiedenmann (1992) consisted of a mirror holder mounted on the lens by means of a rotary pin bearing, allowing for adjustability and for the use of different sized mirrors. One disadvantage was the construction of the mirror having multiple parts, presenting a tendency to lose the initial adjustment due to the use of independent parts which were moveable in relation to each other and with no means of preserving the initial adjustment. Another significant disadvantage was the possibility that the mirror and mirror holder could separate from the rotary pin bearing mounted to the lens, thereby exposing the wearer's eye to the rotary pin which could cause serious injury. Other disadvantages were the complexity of both the mirror unit and the means for adjustment and the pin bearing mount wasn't removable once installed. Most importantly, the mirror holder was not formed at an adequate angle to accomodate modern wraparound sports eyewear, and therefore was not adaptable to current eyewear lenses which vary widely in their radii of curvature.

None of these prior inventions was successfully commercially marketed, and currently there are no rear view mirrors produced on the market designed for placement on the rearward side of the lenses. The only other mirrors now in production are designed to mount outside on the temple of the eyewear, protruding forward several inches from the wearer's face. Besides being relatively heavy and unsightly, these mirrors can snag on clothing, headgear, etc., knocking them out of adjustment, or worse, knocking them off the eyewear to be lost. Consequently, initial commercial marketing of this invention has been very successful, both in the U.S. and abroad.

Another problem with other mirrors now on the market is that when they are used in the rain they suffer from direct exposure to the elements, tend to "fog" and collect moisture. This problem with moisture is compounded because the wearer views these rear view mirrors through the lens of the eyewear, which is also affected by moisture. Additionally, if the lenses are dark tinted, the reflected image is also dark tinted, thereby reducing the image clarity.

A further drawback to the forward-protruding mirror design is the fact that the mirror surface is several inches from the wearer's eye, requiring a relatively large mirror to produce an effective field of view. Also, this type of mirror protrudes into the airstream around the wearer's head, causing a slight "drag," and is thus aerodynamically inefficient. Another disadvantage of the forward-protruding mirror design is that it is not usually transferrable from the left to the right temple of the eyewear.

The most common recent users of rear view eyewear mirrors have been bicyclists. The current trend in sports eyewear is toward smaller radius "wrap-around" lenses and frames. The unique shape of this rear view eyewear mirror allows its manufacture in various angles of between 10 degrees and 45 degrees to fit the many designs of sports eyewear on the present market.

SUMMARY OF THE INVENTION

This rear view eyewear mirror provides a convenient, economical, and lightweight means for rear view vision which is easily installed on the rearward surface of eyewear lenses and may be as easily removed without altering the lens of the eyewear or requiring tools or professional skills. The rear view mirror has no moving parts in relation to each other, and in use is considered to be one piece. It may be simply adjusted and readjusted on the rearward surface of eyewear lenses to the individual wearer, by means of placement and rotation of the rear view eyewear mirror upon the eyewear lens. The rear view mirror's unique shape, adaptability to modern sports eyewear lenses with differing radii of curvature, simplicity of design without moving parts, ease and permanence of adjustment, and removability without altering or damaging the eyewear, distinguish it from prior inventions with a similar purpose.

This rear view eyewear mirror's design is unique, being comprised of a circular reflective surface permanently attached to the circular end of a cylindrical base, which has its other end obliquely cross-sectioned to form an ellipse at an angle of between 10 degrees and 45 degrees. This unique shape of the base in conjunction with double-backed adhesive tape is integral to the invention. Together they allow semi-permanent placement of the rear view eyewear mirror upon the rearward surface of sports eyewear lenses to accommodate individual wearers, providing angular adjustability by rotation of the entire rear view eyewear mirror and allowing the mirror to be used on differing types of sports eyewear.

This rear view mirror is usable on virtually all current designs of eyewear on the market, including popular wraparound sports eyewear. The rear view mirror is also transferrable to the left and/or right eyewear lens due to its symmetrical shape. The rear view mirror is not hampered by the elements, i.e., rain and fog, or by dark tinted eyewear.

The rear view mirror is relatively small but its proximity to the wearer's eye allows for an effective field of view. Therefore, a greater level of safety and awareness for cyclists and other anticipated wearers is achieved. The small size also allows athletes, such as cyclists and runners, to view their competitors without their knowledge, giving them a competitive edge. The rear view mirror's design is aerodynamically efficient, in that it does not protude into the airstream around the wearer's head. Because the rear view mirror does not protrude forward from the eyewear or snag on objects or clothing, it maintains its adjustment indefinitely until the wearer wishes to remove or change it, which is easily accomplished without the use of tools or damage to the eyewear lens.

DESCRIPTION OF THE PREFERRED EMBODIMENTS

Figure 1:
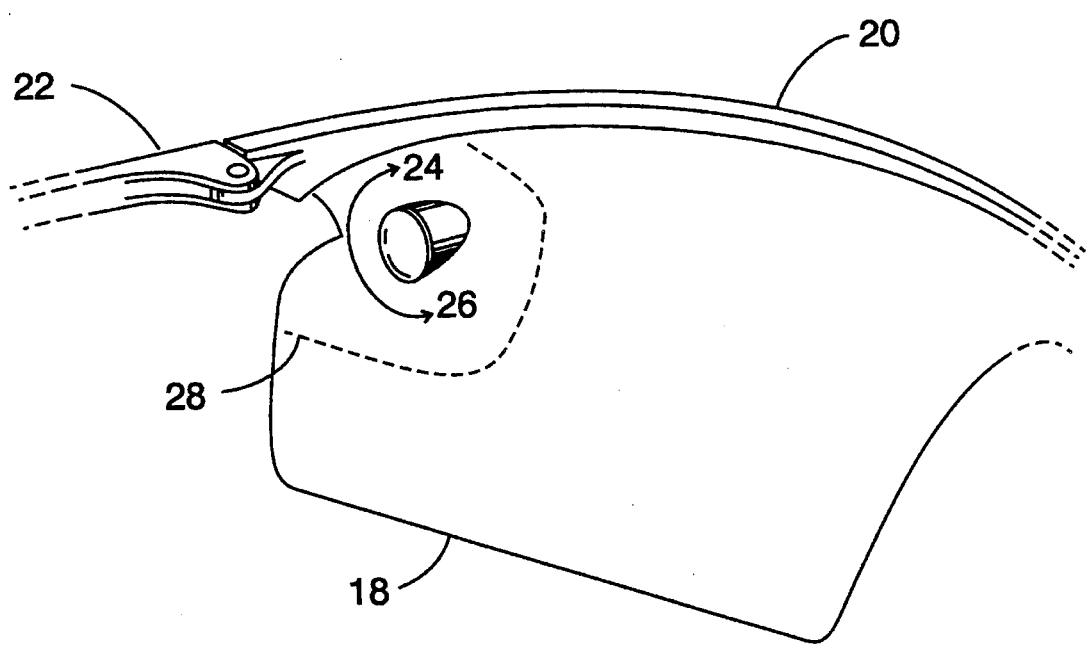
FIG. 1 shows a perspective view of the rear view mirror in place on the rearward surface of typical sports eyewear lens.
Figure 2:
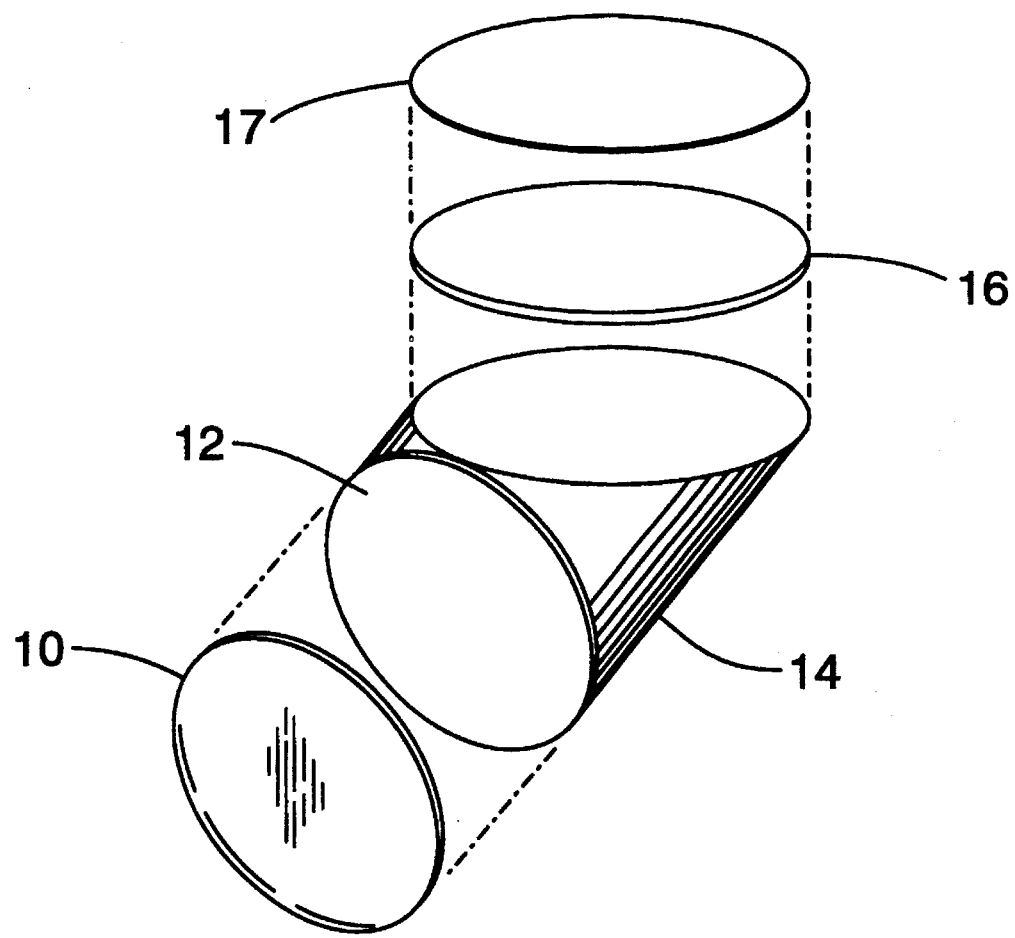
FIG. 2 shows a perspective exploded view of the rear view mirror.

In all figures, reference numerals 10, 12, 14, and 16 collectively constitute a rear view mirror and will hereafter be referred to as "rear view mirror." FIG. 1 shows the rear view mirror attached to the rearward surface of a left lens of typical eyewear within a mounting zone 28. FIG. 2 is a perspective exploded view of a typical embodiment at a sufficient angle to show the general shape and orientation of all component parts. As can be seen in FIG. 2, this rear view mirror is basically a truncated cylinder consisting of a reflective surface 10 which is attached to a base 14 using an epoxy adhesive 12. Base 14 is mounted to the rearward surface of an eyewear lens 18 using a double-backed adhesive tape 16. A non-adhesive film 17 provides protection for the double-backed adhesive tape 16 during shipping and handling.

The most effective diameter of reflective surface 10 and base 14 has been found to be 9 min. This size strikes a compromise between the rear view mirror's protrusion inward from the rearward surface of eyewear lens 18 and the field of view seen by the wearer. This size also provides adequate surface area of double-backed adhesive tape 16 to attach base 14 to rearward surface of eyewear lens 18. A larger diameter rear view mirror would be desirable only to answer a need for a larger field of view.

The material used in the current embodiments for reflective surface 10 is 1.5 mm. clear acrylic mirror, supplied by Laird Plastics, Seattle, Wash. Acrylic mirror of a thinner dimension and various diopters may be used in future embodiments. This material, besides being very lightweight, allows an outer radius to be applied to reflective surface 10, eliminating any sharp edges.

Material used in current embodiments for base 14 is polyethylene available from SWIX, Wilmington, Mass., in extruded form with a diameter of 9 mm. During development of this invention, it was found to be a desirable material due to the ease with which it could be obliquely cross-sectioned at various angles and retain its dimensional stability. Future embodiments of base 14 in all probability will be manufactured from a similar plastic material through use of the "injection molding" process.

Double-backed adhesive tape 16 is shaped to fit the elipse formed by the obliquely cross-sectioned end of base 14. Double-backed adhesive tape 16 is attached to base 14 by its own adhesion. Non-adhesive film 17 is left in place until the moment of application to rearward surface of eyewear lens 18. Double-backed adhesive tape 16 is available in 0.5 min. thickness from 3-M, St. Paul, Minn., and lends itself well to this application. Other adhesives may be used, but this company's #4052 urethane foam tape has worked well in current embodiments.

Figure 3:
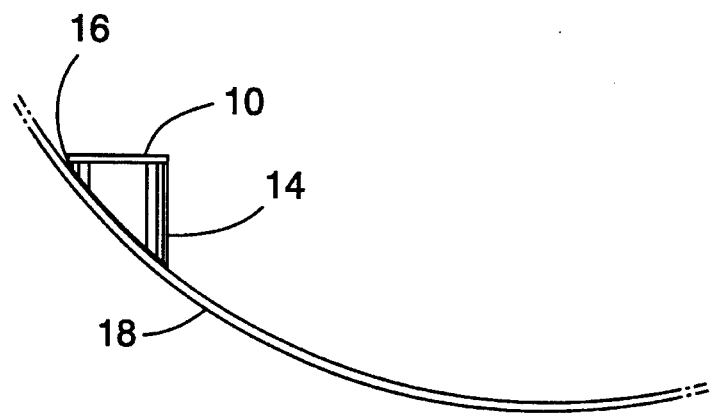
FIG. 3 shows a top view of one embodiment of the rear view mirror, mounted to the rearward surface of eyewear lens of a small radius of curvature.
Figure 4:
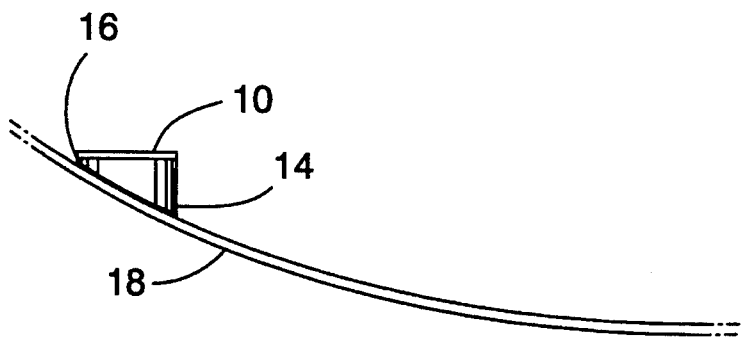
FIG. 4 shows a top view of one embodiment of the rear view mirror, mounted to the rearward surface of an eyewear lens of a greater radius of curvature.
Figure 5:
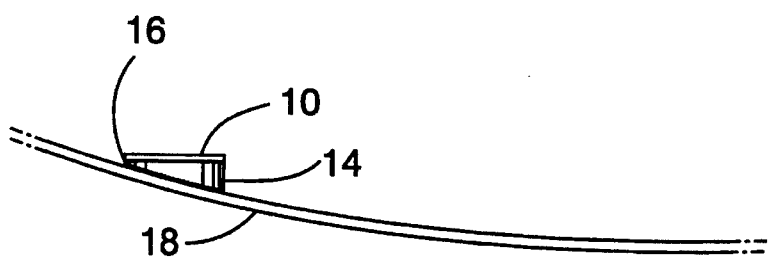
FIG. 5 shows a top view of one embodiment of the rear view mirror, mounted to the rearward surface of an eyewear lens of a still greater radius of curvature.
Figure 6:
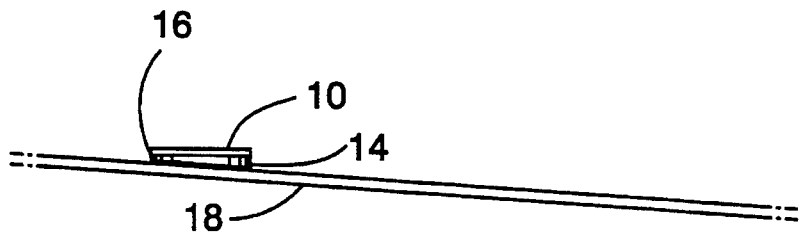
FIG. 6 shows a top view of one embodiment of the rear view mirror, mounted to the rearward surface of an eyewear lens of the largest radius of curvature currently on the market.

FIGS. 3–6 show four further embodiments. What differentiates these is the use of different angles on base 14 to accommodate the various lens radii of curvature found on current brands of eyewear. The radius of curvature illustrated in FIG. 3 represents the smallest radius of curvature encountered on today's eyewear market, approximately 80 mm. On eyewear of this radius of curvature, a base angle of 45 degrees is required. FIGS. 4–6 illustrate types of eyewear using progressively larger radii of curvature eyewear lenses 18, requiring bases 14 of correspondingly diminishing angles. As the radius of curvature of eyewear lens 18 increases, the angle used on base 14 decreases. The base angle required in FIG. 6 is approximately 10 degrees.

At this time it appears that these four embodiments will be adequate to accommodate all current eyewear on the market. Future embodiments may be developed to accommodate future designs, requiring different base angles between 45 degrees and 10 degrees.

FIG. 1 illustrates a rear view mirror mounted to the rearward surface of a left lens of typical sports eyewear. An eyewear frame 20 and an eyewear temple 22 are shown for orientation purposes. After removal of non-adhesive film 17, rear view mirror is placed where convenient within mounting zone 28 on rearward surface of eyewear lens 18. With the use of light finger pressure on rear view mirror during initial application, it can be repeatedly viewed, dismounted, rotated, and remounted until the reflected image of reflective surface 10 is satisfactory to the individual wearer. During this short initial angular adjustment period, the reflected image of reflective surface 10 may be adjusted left and up by clockwise rotation 24 of the rear view mirror during application. To move the reflected image of reflective surface 10 right and down, rear view mirror is rotated counter-clockwise 26.

This angular adjustment procedure is accomplished by "trial and error," using light finger pressure on rear-view mirror so as not to permanently attach it to rearward surface of lens 18 until a satisfactory field of view for the individual wearer is achieved. At this time, rear view mirror is forcefully applied against rearward surface of eyewear lens 18, thereby attaching it semi-permanently. Double-backed adhesive tape 16 provides sufficient adhesion between base 14 and rearward surface of eyewear lens 18 to now be considered as permanently bonded for normal use. However, in the event the individual wearer wishes to readjust or remove rear view mirror, it is easily removable without tools by the use of a forceful peeling motion with the fingers. Removal will leave no adhesive residue on rearward surface of eyewear lens 18.

Bicyclists residing in the U.S. are accustomed to traffic which occupies the right lane of travel, and therefore will likely mount this rear view mirror to the left lens of eyewear. However, the symmetrical shape of this rear view mirror allows it to be installed and used on either, or both, lenses.

If mounted to the right lens of eyewear, the angular adjustment procedure differs as follows: to adjust the reflected image of reflective surface 10 right and up, the rear view mirror is rotated counter-clockwise 26. To adjust the reflected image of reflective surface 10 left and down, the rear view mirror is rotated clockwise 24.

I claim:

1. A rear view eyewear mirror consisting of a circular reflective surface consisting of a plastic material permanently attached by epoxy adhesive to a cylindrical base consisting of a plastic material approximately 9 mm. in diameter, obliquely cross sectioned and semipermanently attached with double backed adhesive tape to a rearward surface of either of the lenses within a sports eyewear frame.

2. The rear view eyewear mirror of claim 1 having a means for angular adjustment of said reflective surface by the oblique cross sectioning of said cylindrical base at an angle of between 10 degrees and 45 degrees, thereby forming an elliptical end conforming to differing radii of curvature of said rearward surface of lenses within said sports eyewear frame.

3. The rear view eyewear mirror of claim 1 having said elliptical end formed by said oblique cross sectioning of said cylindrical base to allow said rear view eyewear mirror unit to be angularly adjusted by clockwise and counter clockwise rotation and by placement upon said rearward surface of lenses within said sports eyewear frame.

4. The rear view eyewear mirror of claim 1 having no moving parts in relation to each other, wherein the adjustment, once accomplished, is semipermanently affixed.

5. The rear view eyewear mirror of claim 1 being transferable to said rearward surface of either or both lenses within said sports eyewear frame.

* * * * *

UNITED STATES PATENT AND TRADEMARK OFFICE
CERTIFICATE OF CORRECTION

PATENT NO. : 5,537,160
DATED : July 16, 1996
INVENTOR(S) : Kevin R. King

It is certified that error appears in the above-indentified patent and that said Letters Patent is hereby corrected as shown below:

On the title page, item [57] Abstract: line 1, change "min." to --mm.--
Col. 5, line 7, change "min." to -- mm.--.
Col. 5, line 37, change "min." to --mm.--

Signed and Sealed this

Fifteenth Day of October, 1996

BRUCE LEHMAN

Attest:

Attesting Officer

Commissioner of Patents and Trademarks